(12) United States Patent
Wang

(10) Patent No.: US 7,487,859 B2
(45) Date of Patent: Feb. 10, 2009

(54) COMBINATION HAND TRUCK LADDER

(76) Inventor: Sheng-Shih Wang, No. 1, Sec. 1, Sinsing Rd., P.O. Box 36-38, Tanzih Township, Taichung County 427 (TW)

( * ) Notice: Subject to any disclaimer, the term of this patent is extended or adjusted under 35 U.S.C. 154(b) by 590 days.

(21) Appl. No.: 11/226,941

(22) Filed: Sep. 14, 2005

(65) Prior Publication Data

US 2007/0056797 A1 Mar. 15, 2007

(51) Int. Cl.
*E06G 1/00* (2006.01)
(52) U.S. Cl. ............................ 182/21; 182/20
(58) Field of Classification Search .................. 182/20, 182/21; 280/47.16, 30
See application file for complete search history.

(56) References Cited

U.S. PATENT DOCUMENTS

| 4,258,826 | A | * | 3/1981 | Murray | 182/20 |
|---|---|---|---|---|---|
| 4,494,626 | A | * | 1/1985 | Ast | 182/20 |
| 6,039,149 | A | * | 3/2000 | Bedja et al. | 182/20 |
| 6,880,835 | B2 | * | 4/2005 | Tornabene et al. | 280/30 |
| 7,104,362 | B2 | * | 9/2006 | Meeker | 182/165 |
| 2004/0200667 | A1 | * | 10/2004 | Babkes et al. | 182/20 |

* cited by examiner

*Primary Examiner*—Katherine Mitchell
*Assistant Examiner*—Candace L. Bradford
(74) *Attorney, Agent, or Firm*—Charles E. Baxley

(57) ABSTRACT

A combination hand truck ladder, which includes two front rails, two rear rails pivoted to the front rails, two folding braces coupled between the front rails and the rear rails, platforms pivoted to the front rails at different elevations and linked by two links, two wheels respectively pivoted to the bottom ends of the rear rails, two slides respectively affixed to the rear rails and slidably coupled to the links, a carrier shell pivoted to the front rails at the bottom side, and a hand truck handle affixed to the top ends of the rear rails.

11 Claims, 10 Drawing Sheets

COMBINATION HAND TRUCK LADDER

BACKGROUND OF THE INVENTION

1. Field of the Invention

The present invention relates ladders and more particularly, to a combination hand truck ladder that can be used as a hand truck for moving things as well as a platform ladder for use in climbing.

2. Description of the Related Art

A conventional combination hand truck ladder, as shown in FIG. 1, comprises a front frame 1, a back frame 2 pivoted to the front frame 1 near the top side of the front frame 1, a plurality of platforms 3 respectively pivotally connected to the front frame 1 at different elevations, two links 4 respectively pivotally connected to the two distal ends of the rear side of each of the platforms 3, a rear transverse rod 6 inserted through a respective elongated slot 5 at the top side of each of the links 4 and pivotally connected to the back frame 2, two wheels 7 respectively pivotally connected to the bottom side of the back frame 2, a front transverse rod 9 fixedly fastened to the front frame 1 at the bottom side, and a carrier shell 8 pivoted to the front transverse rod 9.

When wishing to use this combination hand truck ladder as a platform ladder in climbing, the front frame 1 and the back frame 2 are extended out and stably supported on the floor. At this time, the links 4 are moved with the back frame 2 relative to the front frame 1 to hold the platforms 3 in horizontal, and the carrier shell 8 is closely received to the front frame 1. When wishing to use this combination hand truck ladder as a hand truck for carrying things, the front frame 1 and the back frame 2 are received together and tilted, letting the wheels 7 support the gravity weight of the whole assembly of the combination hand truck and ladder. At this time, the links 4 are forced to turn the platforms 3 downwards and to keep the platforms 3 closely received to the front frame 1, and the carrier shell 8 is extended out of the front frame 1 for carrying things. Thus, the user can hold the top side of the front frame 1 and push the whole assembly of the combination hand truck ladder on the floor with less effort.

The aforesaid combination hand truck ladder is functional, however it wears quickly with use.

SUMMARY OF THE INVENTION

It is one object of the present invention to provide a combination hand truck ladder, which is strong and durable in use. It is another object of the present invention to provide a combination hand truck ladder, can be conveniently set between the hand truck mode and the platform ladder mode, and conveniently moved on the floor with less effort when set in the hand truck mode. It is still another object of the present invention to provide a combination hand truck ladder, which safe and comfortable in use.

According to one aspect of the present invention, the combination hand truck ladder comprises a pair of front rails; a pair of rear rails; two lugs respectively fixedly fastened to respective top ends of the rear rails and respectively pivoted to respective top ends of the front rails; two wheels respectively pivotally mounted on respective bottom ends of the rear rails; a plurality of platforms, the platforms each having a front side respectively pivotally connected between the front rails at different elevations and a rear side; two platform links respectively pivotally connected to two distal ends of the rear side of each of the platforms; a transverse bar transversely connected between respective bottom ends of the front rails; a carrier shell pivotally coupled to the transverse bar; a hand truck handle, the hand truck handle having two parallel end portions respectively affixed to the lugs at the rear rails; and two folding braces respectively bilaterally coupled between the front rails and the rear rails and adapted to support the front rails and the rear rails in an extended position.

When the user extend out the front rails and the rear rails, the folding braces are extended out to support the front and rear rails in the extended position so that the combination hand truck ladder is stably positioned on the floor for use as a platform ladder. When the combination hand truck ladder is used as a platform ladder, the use can sit on the top platform with the back supported on the hand truck handle comfortably.

According to another aspect of the present invention, rigid reinforcing frame members are respectively provided at the front rears and the two opposite lateral sides of each of the platforms to reinforce the structural strength of the front rails and the platforms around the connection areas between the front rails and the platforms.

According to still another aspect of the present invention, a footplate is fixedly fastened to the front rails and horizontally set between the transverse bar and the lowest platform, and a rubber rod member is fixedly fastened to the front side of the footplate for use as a cushion to support the carrier shell in the received position.

According to still another aspect of the present invention, a pivot pin is inserted through knuckles at the transverse bar and fixedly fastened to rear knuckles at the carrier shell to pivotally couple the carrier shell to the transverse bar, and the carrier shell has a stop flange extending from the rear side for stopping against the transverse bar to hold the carrier shell firmly in the extended position for carrying things.

According to still another aspect of the present invention, a buffer structure is provided between the transverse bar and the carrier shell for buffering outward motion of the carrier shell when the user turns the carrier shell outwards from the received position to the extended position.

DETAILED DESCRIPTION OF THE PREFERRED EMBODIMENT

Figure 1:
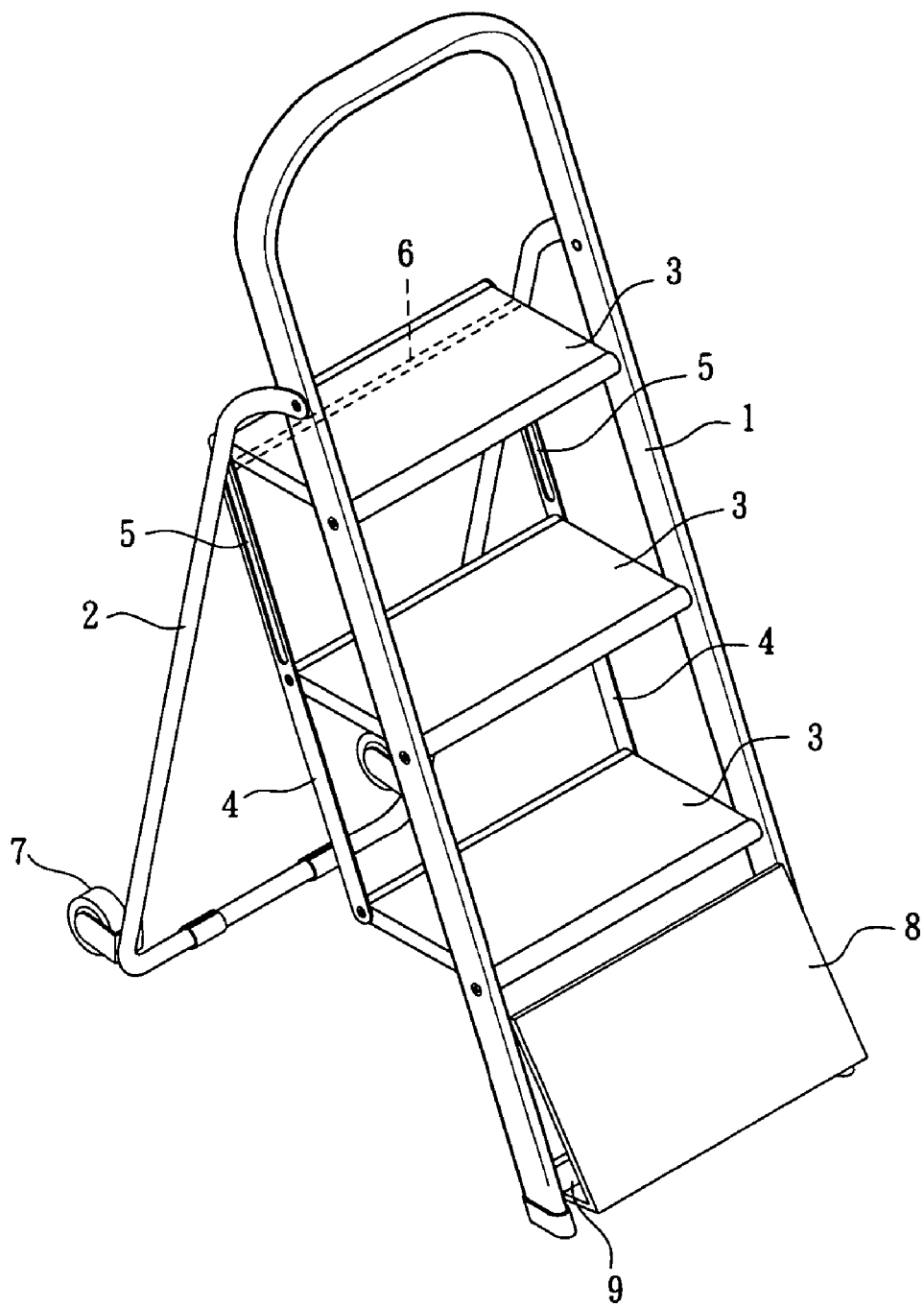
FIG. 1 is an elevational view of a combination hand truck ladder according to the prior art, showing the combination hand truck ladder set in the mode for use as a platform ladder.
Figure 2:
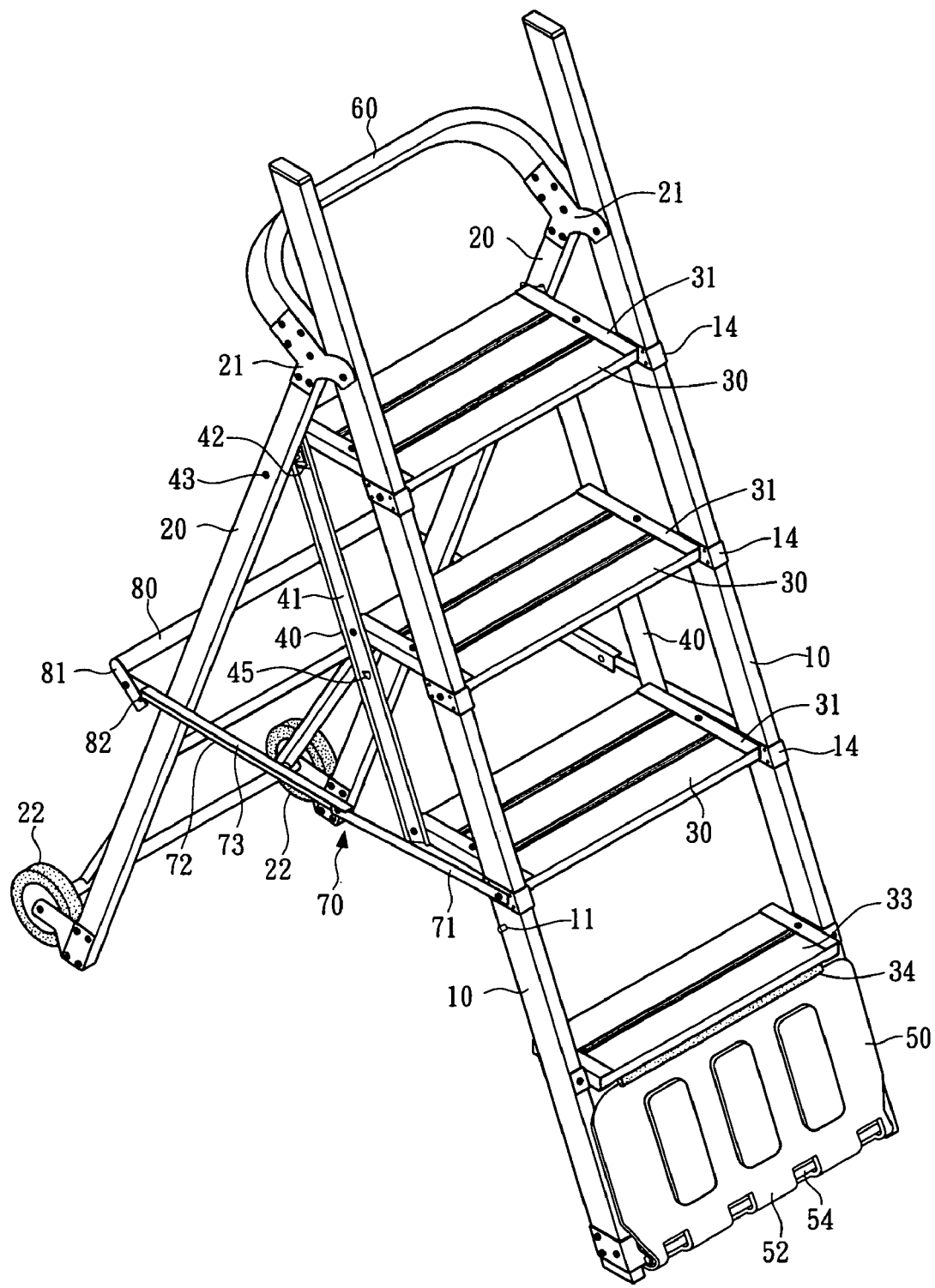
FIG. 2 is an elevational view of a combination hand truck ladder according to the present invention, showing the combination hand truck ladder set in the mode for use as a platform ladder.
Figure 3:
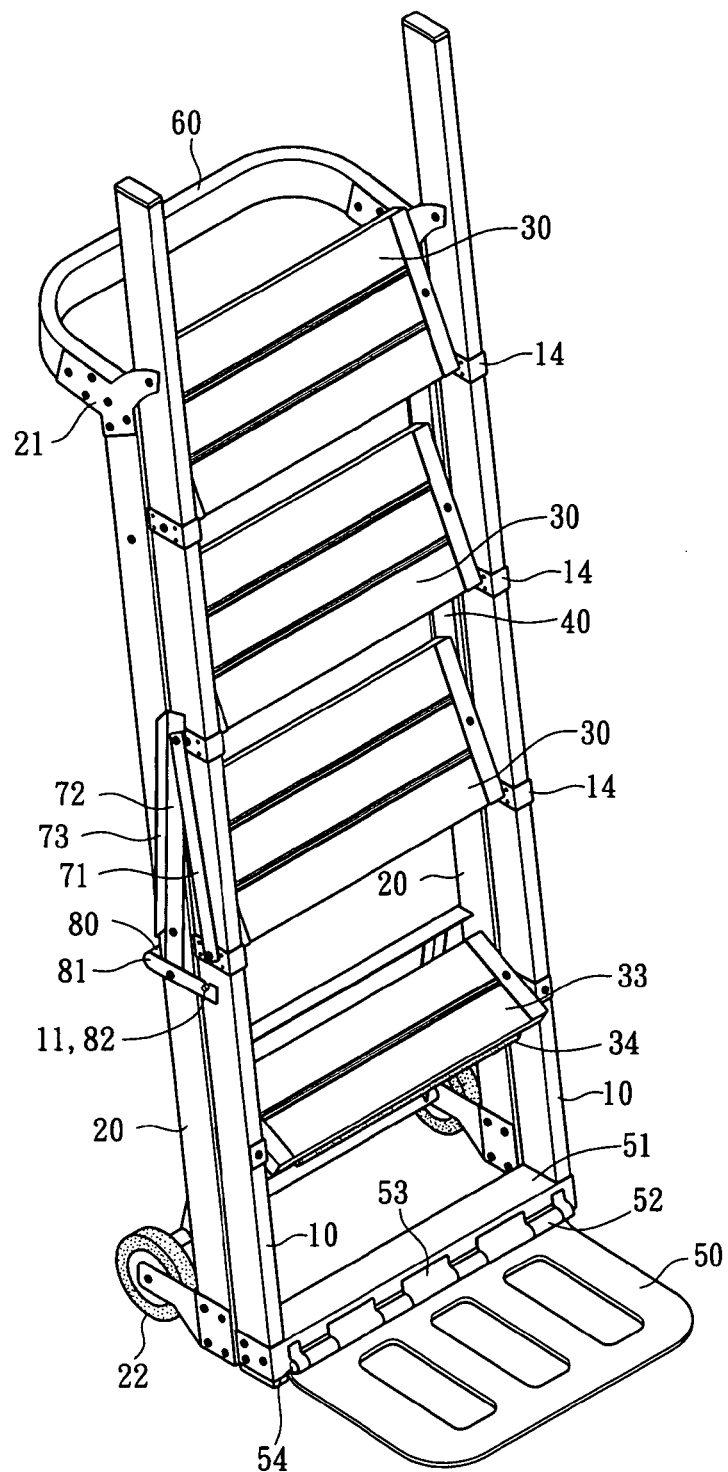
FIG. 3 is another elovational view of the present invention, showing the combination hand truck ladder set in the mode for use as a hand truck.
Figure 4:
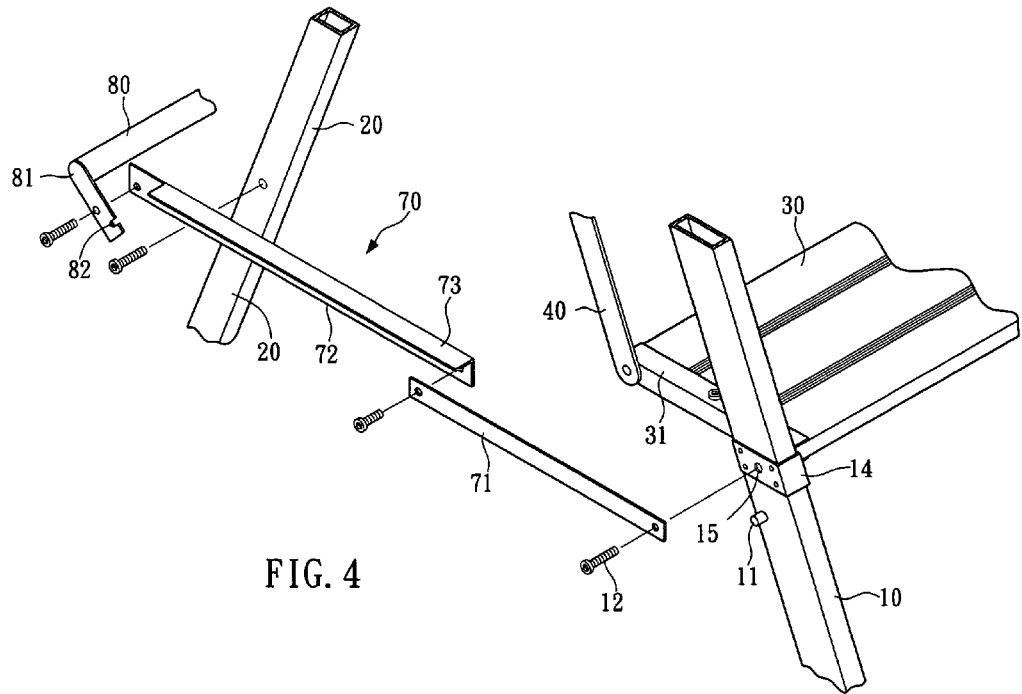
FIG. 4 is an exploded view of a part of the present invention, showing the mounting structure of the folding brace.
Figure 11:
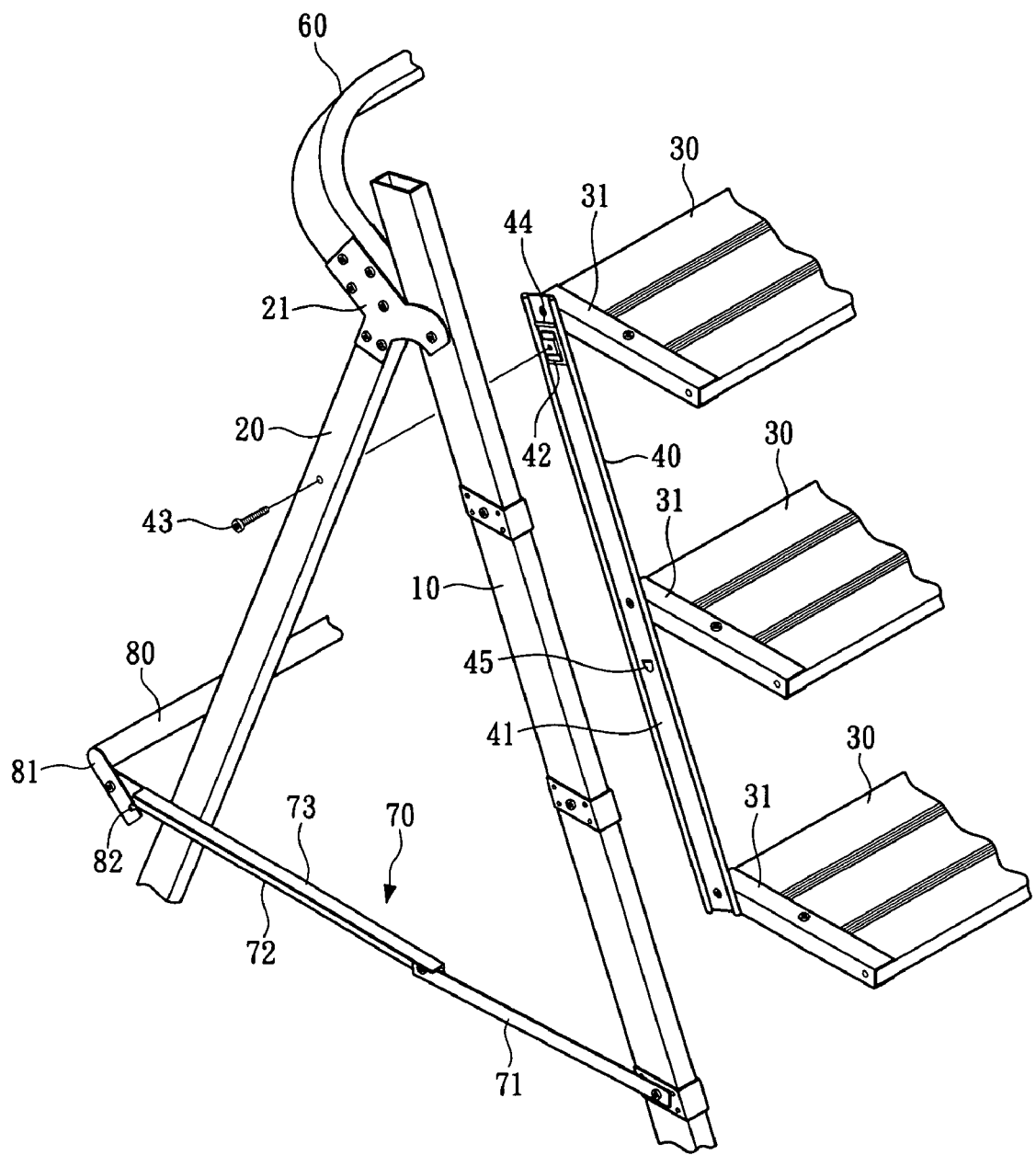
FIG. 11 is an exploded view of a part of the present invention, showing the coupling structure between the platform links and the front and rear rails.

Referring to the annexed drawings in detail, a combination hand truck ladder in accordance with the present invention is shown comprising:

a pair of front rails 10 (see FIGS. 2 and 3);

a pair of rear rails 20 (see FIGS. 2 and 3);

two lugs 21 respectively fixedly fastened to the top ends of the rear rails 20 and respectively pivoted to the front rails 10 near the top ends of the front rails 10 (see FIGS. 2 and 3);

two wheels 22 respectively pivotally mounted on the bottom ends of the rear rails 20 (see FIGS. 2 and 3);

a plurality of platforms 30, each having a front side respectively pivotally connected between the front rails 10 at different elevations (see FIGS. 2 and 3);

two platform links 40 respectively pivotally connected to the two distal ends of the rear side of each of the platforms 30, each platform link 40 having a longitudinally extending sliding groove 41 (see FIGS. 2 and 11);

two slides 42 respectively coupled to the sliding grooves 41 of the links 40 and respectively fixedly fastened to the rear rails 20 by a respective fastening member 43 (see FIGS. 2 and 11);

two first stop blocks 44 and two second stop blocks 45 respectively fixedly fastened to the sliding grooves 41 of the links 40 at different elevations for stooping the respective slides 42 to limit the moving distance of the slides 42 in the sliding grooves 41 of the links 40 (see FIGS. 2 and 11);

a front transverse bar 51 transversely connected between the bottom ends of the front rails 10 (see FIGS. 2 and 3);

a carrier shell 50 pivotally coupled to the front transverse bar 51 (see FIGS. 2 and 3);

a U-shaped hand truck handle 60, which has the two parallel end portions thereof respectively affixed to the lugs 21 at the top ends of the rear rails 20 (see FIGS. 2 and 3) at an angle over 90-degrees relative to rear rails 20;

two braces 70 respectively bilaterally coupled between the front rails 10 and the rear rails 20, each brace 70 comprising a first brace member 71, which has a first end pivoted to one front rail 10 and a second end, a second brace member 72, which has a first end pivoted to one rear rail 20 and a second end pivoted to the second end of the first brace member 71, and a stop flange 73 formed integral with and perpendicularly extending from one long side of the second brace member 72 for stopping against one long side of the first brace member 71 to hold the first brace member 71 and the second brace member 72 in a longitudinally aligned position when the respective brace 70 is extended out (see FIGS. 2, 3 and 4); and a brace handle 80, which has two parallel end portions 81 respectively pivotally connected to the first ends of the second brace members 72 of the braces 70 and two locating notches 82 respectively formed on the end portions 81 at a top side for receiving a respective locating pin 11 at each of the front rails 10 to hold the front rails 10 and the rear rails 20 in place after the front rails 10 and the rear rails 20 have been received together (see FIGS. 2 and 4).

Referring to FIG. 2, when using the combination hand truck ladder as a platform ladder, pull the brace handle 80 to extend out the braces 70 and to force the respective stop flanges 73 against the respective first brace members 71, holding the front rails 10 and the rear rails 20 at an angle. At this time, the slides 42 are respectively stopped at the respective first stop blocks 44, the platform links 40 are spaced between the front rails 10 and the rear rails 20 and kept in parallel to the front rails 10, the platforms 30 are kept in horizontal at different elevations, the carrier shell 50 is closely received to the front rails 10, and the wheels 22 are kept spaced above the floor. Thus, the user can stand on the platforms 30, or sit on the top platform 30 and rest the back on the hand truck handle 60 to work at a high place.

Referring to FIG. 3, when using the combination hand truck ladder as a hand truck, impart an upward pressure to the braces 70 to fold up the respective first brace members 71 and the respective second brace members 72 and to move the rear rails 20 toward the front rails 10. At this time, the platform links 30 are moved to lover the rear side of each of the platforms 30 and to receive the platforms 30 to the front rails 10, and the respective slides 42 are moved along the respective sliding grooves 41 to the respective second stop blocks 45. When the front rails 10 and the rear rails 20 are received together, the respective locating pins 11 are respectively forced into engagement with the locating notches 82 to hold the front rails 10 and the rear rails 20 in the received condition. Thereafter, the carrier shell 50 is extended out for carrying things, and the combination hand truck ladder is tilted to have the wheels 22 support the whole structure of the combination hand truck ladder on the floor, and the user can then push the hand truck handle 60 to move the combination hand truck ladder and the load on the floor from one placed to another with less effort.

In addition to the aforesaid basic construction, the combination hand truck ladder has some other reinforced structures as described hereinafter.

Figure 5:
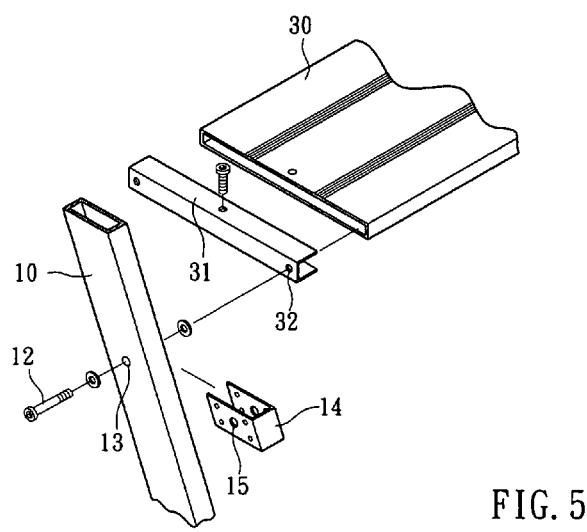
FIG. 5 is an exploded view of a part of the present invention, showing the reinforced structure between the front rail and the platform.

Because the front rails 10 and the platforms 30 are respectively extruded from aluminum, the connection area between each front rail 10 and each platform 30 may wear quickly with use. In order to eliminate this problem, the connection between each front rail 10 and the respective platform 30 is reinforced. As shown in FIGS. 2 and 5, rigid reinforcing frame members 14, 31 are respectively attached to the front rails 10 and the two opposite lateral sides of each of the platforms 30, and pivot bolts 12 are respectively mounted in respective pivot holes 13 at the front rails 10 and the respective through holes 15, 32 at the rigid reinforcing frame members 14, 31 and fastened to the respective platforms 30 to pivotally secure the platforms 30 to the front rails 10.

Figure 6:
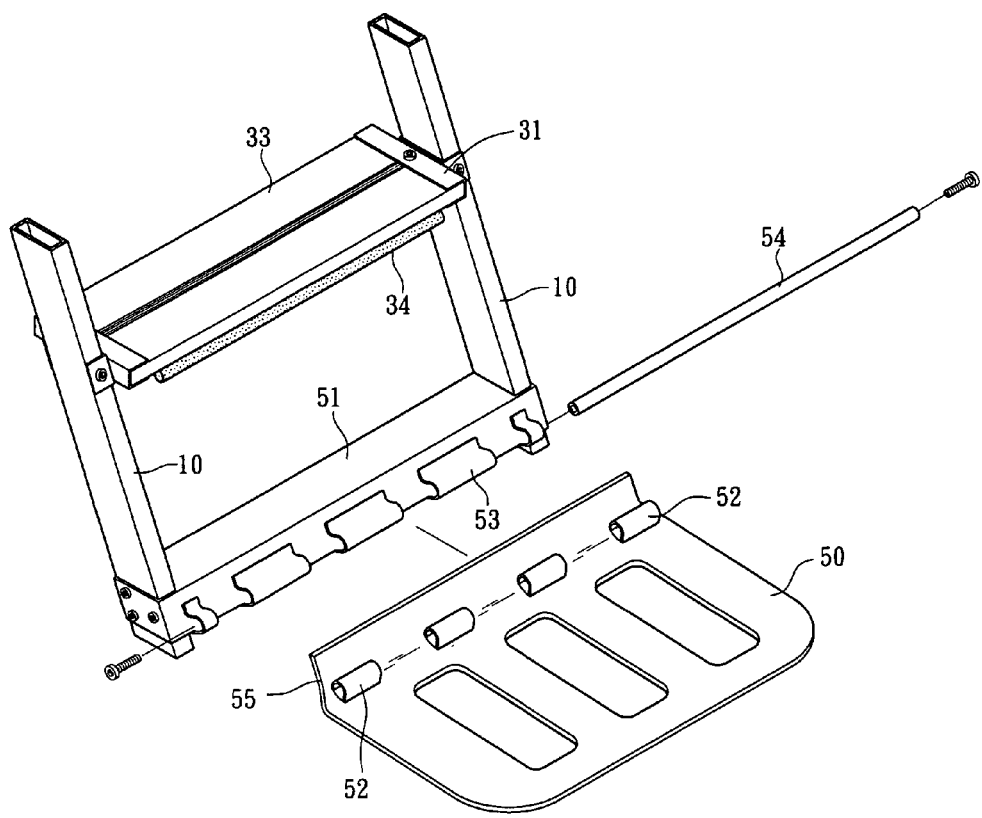
FIG. 6 is an exploded view of a part of the present invention, showing the mounting structure of the carrier shell.
Figure 7:
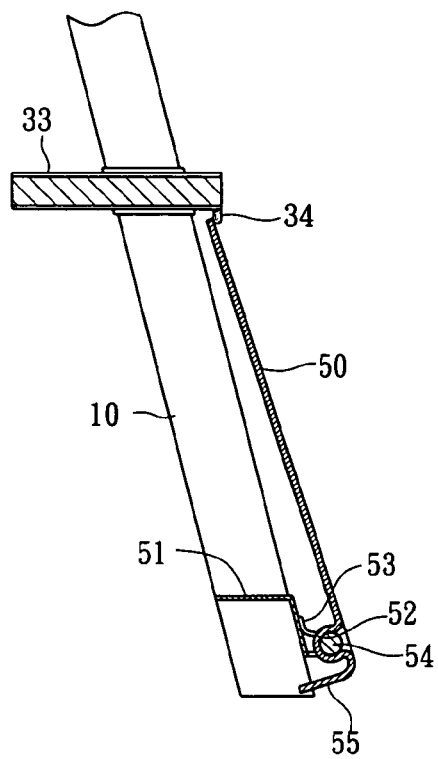
FIG. 7 is a sectional view of a part of the present invention, showing the carrier shell received to the rubber rod at the footplate at the front rails.
Figure 8:
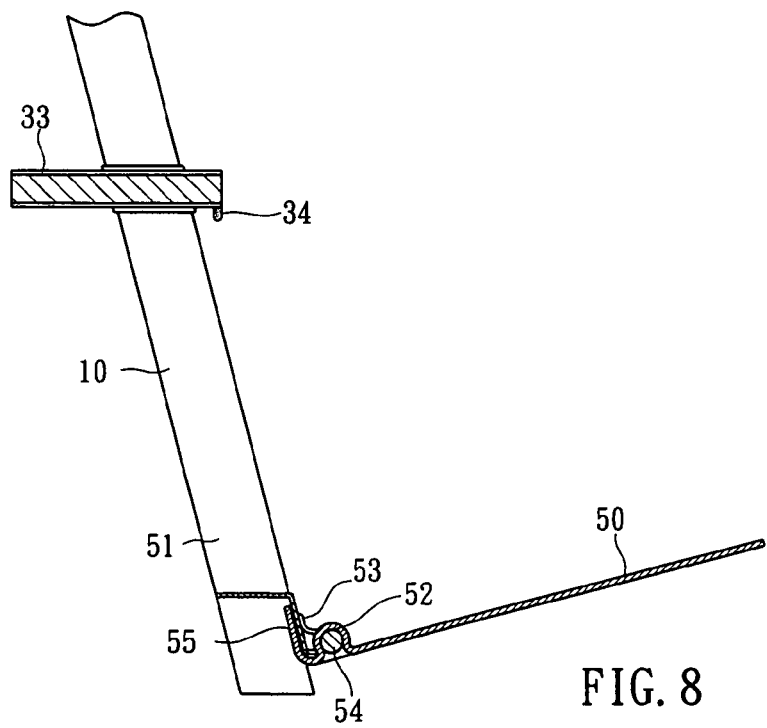
FIG. 8 is similar to FIG. 7 but showing the carrier shell extended out.

Referring to FIGS. 6~8, a footplate 33 is fixedly fastened to the front rails 10 and arranged in parallel between the lowest platform 30 and the transverse bar 51. The user can step on the footplate 31 before stepping on the lowest platform 30. Further, the footplate 33 has a flexible rod member, for example, a rubber rod 34 provided at the front side for supporting the carrier shell 50 in the received position, preventing falling of the carrier shell 50 from the received position to the extended position accidentally. When using the carrier shell 50, impart a proper pull force to the carrier shell 50 to turn the carrier shell 50 outwards from the rubber rod 34.

Referring to FIGS. 2 and 5 again, the transverse bar 51 has a plurality of knuckles 53 arranged in a line at the front side. The carrier shell 50 has a plurality of knuckles 52 arranged in a line near the rear side and respectively pivotally coupled to the knuckles 53 at the transverse bar 51 by a pivot pin 54. The carrier shell 50 further has a stop flange 55 extending from the rear side at an angle for stopping against the transverse bar 51 to support the carrier shell 50 in the extended position for holding things.

Figure 9:
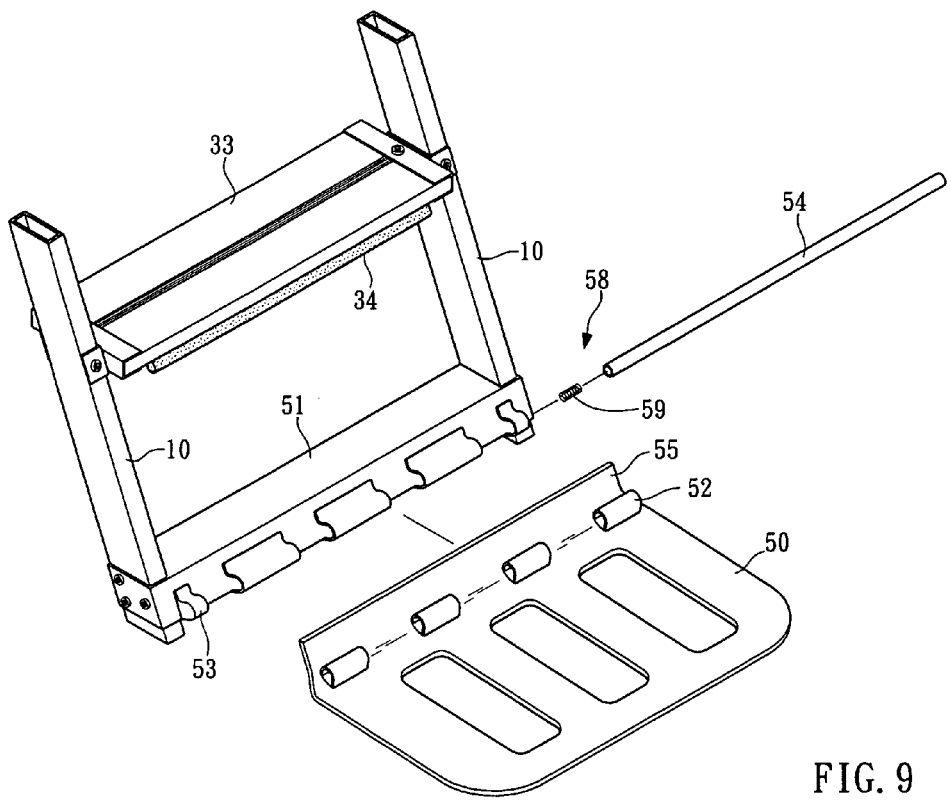
FIG. 9 is an exploded view of a part of the present invention, showing relationship between the buffer structure and the front rails and carrier shell.
Figure 10:
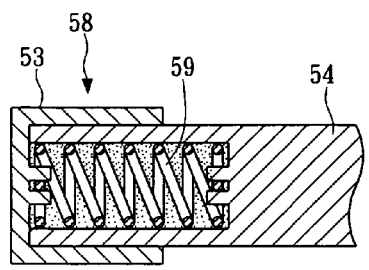
FIG. 10 is a sectional view showing of a part of the present invention showing the buffer structure set in between one knuckle at the transverse bar and the pivot pin.

Referring to FIGS. 9 and 10, a buffer structure 58 is provided between the left-sided knuckle 53 at the transverse bar 51 and the pivot pin 54 to buffer the motion of the carrier shell 50, preventing an accident. The buffer structure 58 comprises a high viscosity fluid filled in a recessed end hole at one end of the pivot pin 54, and a torsional spring 59 embedded in the viscosity fluid and connected between the left-sided knuckle 53 at the transverse bar 51 and the pivot pin 54. According to this embodiment, the pivot pin 54 is affixed to the knuckles 52 of the carrier shell 50 and turnable with the carrier shell 50 relative to the knuckles 53 at the transverse bar 51. When receiving the carrier shell 50 to the rubber rod 34 and the front rails 10, the torsional spring 59 is compressed to reserve energy. When the user turning the carrier shell 50 outwards from the rubber rod 34 and the front rails 10, the torsional spring 59 releases the force to force the carrier shell 50 outwards to the extended position. However, the effect of the high viscosity fluid buffers the action of the torsional spring 59, preventing sadden falling of the carrier shell 50 from the received position to the extended position.

Figure 12:
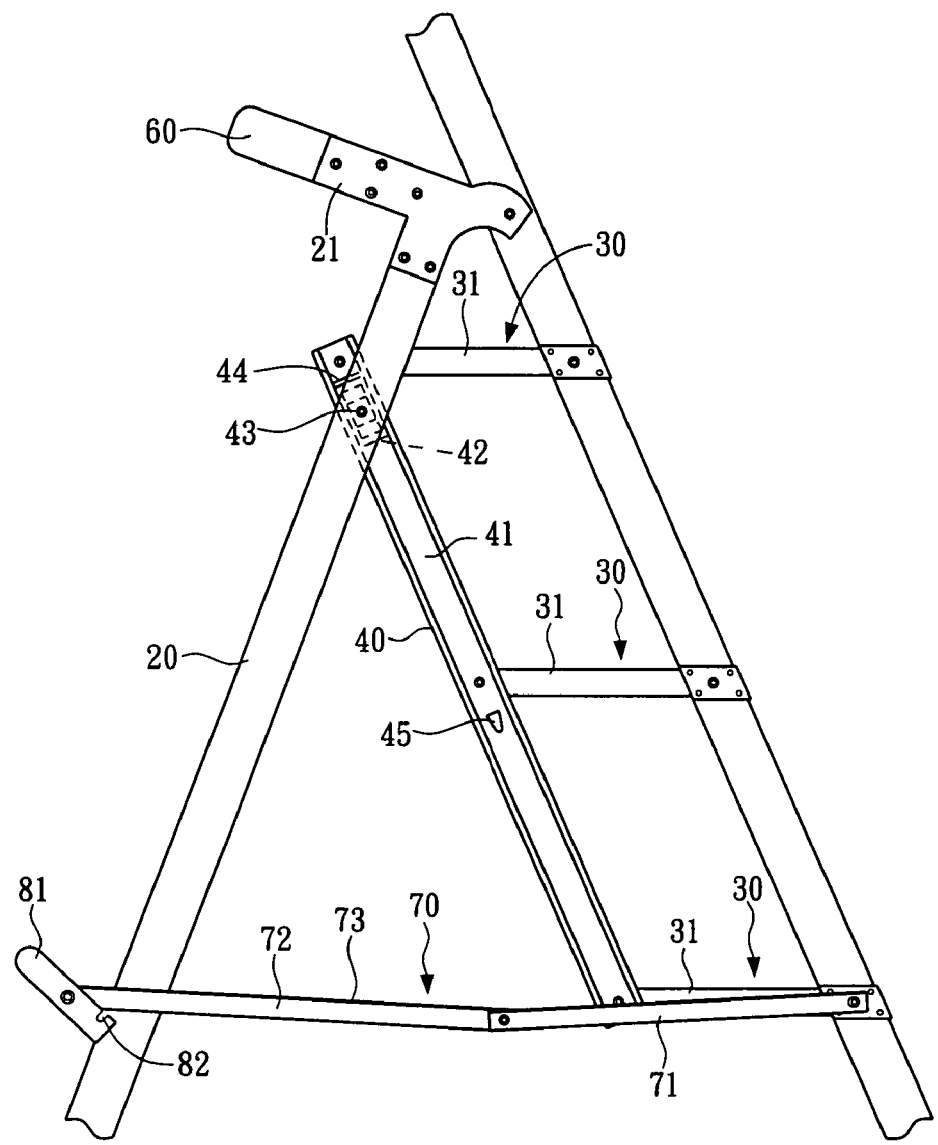
FIG. 12 is a plain assembly view of FIG. 11.
Figure 13:
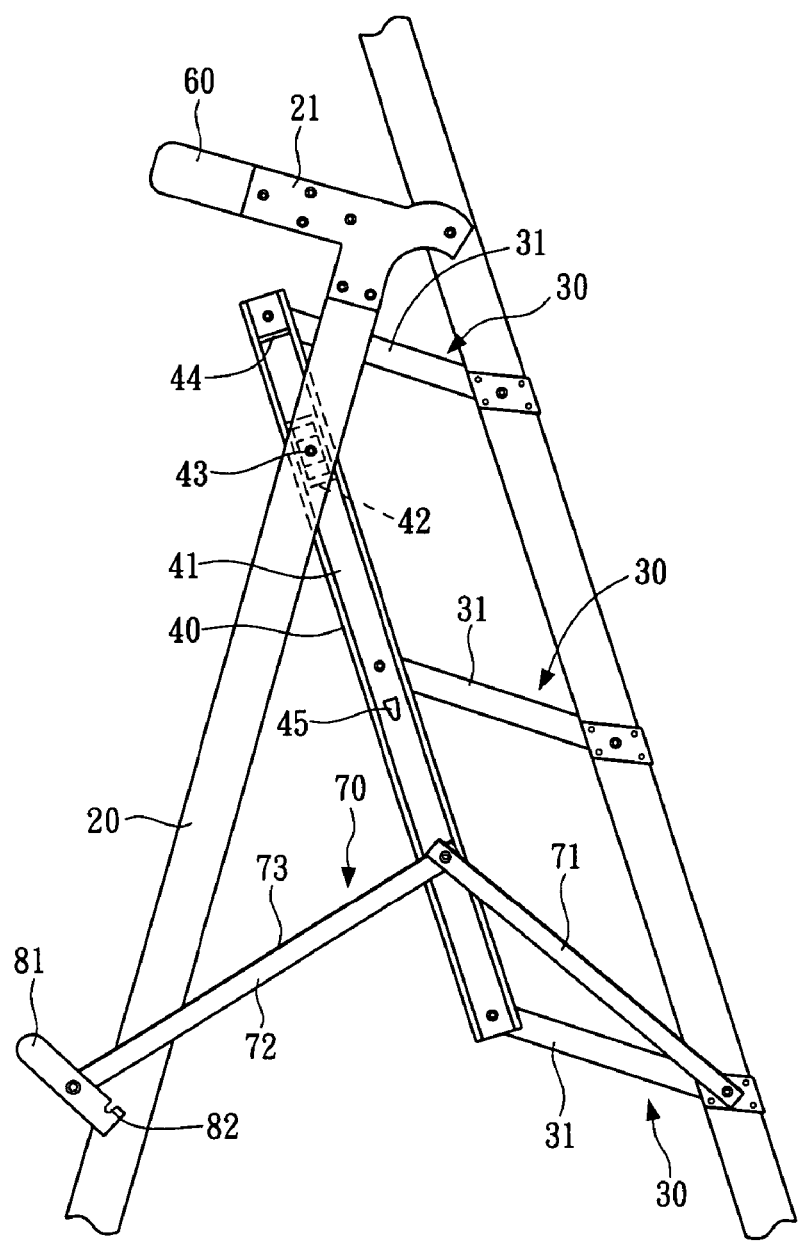
FIG. 13 corresponds to FIG. 12, showing the folding action of the folding brace.

Referring to FIGS. 11~13, when the combination hand truck ladder is extended out for use as a platform ladder, the slides 42 are moved upwards along the respective sliding grooves 41 and stopped at the respective first stop blocks 44. On the contrary, when receiving the combination hand truck ladder, the slides 42 are moved downwards along the respective sliding grooves 41 toward the respective second stop blocks b45b.

Although a particular embodiment of the invention has been described in detail for purposes of illustration, various modifications and enhancements may be made without departing from the spirit and scope of the invention.

What the invention claimed is:

1. A combination hand truck ladder comprising:
   a pair of front rails;
   a pair of rear rails;
   two lugs respectively fixedly fastened to respective top ends of said rear rails and respectively pivoted to respective top ends of said front rails;
   two wheels respectively pivotally mounted on respective bottom ends of said rear rails;
   a plurality of platforms, said platforms each having a front side respectively pivotally connected between said front rails at different elevations and a rear side;
   two platform links respectively pivotally connected to two distal ends of the rear side of each of said platforms;
   a transverse bar transversely connected between respective bottom ends of said front rails;
   a carrier shell pivotally coupled to said transverse bar;
   a hand truck handle, said hand truck handle having two parallel end portions respectively affixed to said lugs at said rear rails; and
   two folding braces respectively bilaterally coupled between said front rails and said rear rails and adapted to support said front rails and said rear rails in an extended position wherein said transverse bar comprises a plurality of knuckles arranged in a line; said carrier shell comprises a plurality of knuckles arranged in a line near a rear side thereof and pivotally coupled to the knuckles at said transverse bar, and a pivot pin fixedly fastened to the knuckles of said carrier shell and pivotally connected the knuckles at said transverse bar further comprising a buffer structure coupled between one knuckle at said transverse bar and the pivot pin of said carrier shell wherein said buffer structure comprises a fluid filled in one end of said pivot pin and a torsional spring embedded in said fluid and connected between one knuckle at said transverse bar and the pivot pin of said carrier shell.

2. The combination hand truck ladder as claimed in claim 1 wherein said platforms each have two opposite lateral sides respectively mounted with a respective rigid reinforcing frame member and respectively pivotally connected to said front rails by a respective pivot.

3. The combination hand truck ladder as claimed in claim 1 wherein said front rails each have a plurality of rigid reinforcing frame members fixedly mounted thereon at different elevations corresponding to said platforms; said platforms are respectively pivoted to said rigid reinforcing frame members and said front rails by a respective pivot.

4. The combination hand truck ladder as claimed in claim 1 further comprising a footplate fixedly and transversely fastened to said front rails and spaced below said platforms and above said transverse bar.

5. The combination hand truck ladder as claimed in claim 4, wherein said footplate has a front side fixedly provided with a flexible rod-like cushion member.

6. The combination hand truck ladder as claimed in claim 1 wherein said carrier shell has a stop flange extending from the rear side thereof at an angle for stopping against said transverse bar to support said carrier shell in an extended position for carrying things.

7. The combination hand truck ladder as claimed in claim 1 wherein said platform links each have a longitudinally extending sliding groove; said rear rails each have a slide fixedly fastened thereto and respectively slidably coupled to the longitudinally extending sliding grooves of said platform links.

8. The combination hand truck ladder as claimed in claim 7, wherein said platform links each have a first stop block and a second stop block respectively fixedly fastened to the respective sliding groove at different elevations to limit the moving distance of the slides of said rear rails in the sliding grooves of said platform links.

9. The combination hand truck ladder as claimed in claim 1 wherein said hand truck handle define with said rear rails a contained angle over 90-degrees.

10. The combination hand truck ladder as claimed in claim 1 wherein said folding braces each comprise a first brace member, which has a first end pivoted to one of said front rails and a second end, a second brace member, which has a first end pivoted to one of said rear rails and a second end pivoted to the second end of said first brace member, and a stop flange formed integral with and perpendicularly extending from one long side of said second brace member fro stopping against one long side of said first brace member to hold said first brace member and said second brace member in a longitudinally aligned position when the respective folding brace is extended out.

11. The combination hand truck ladder as claimed in claim 10, further comprising brace handle, which has two parallel end portions respectively pivotally connected to the first ends of the second brace members of said folding braces and two locating notches respectively formed on the end portions thereof at a top side for receiving a respective locating pin at each of said front rails to hold said front rails and said rear rails in place after said front rails and said rear rail have been received together.

* * * * *